J. C. Wilson,
Horse Clipper.
No. 109,479. Patented Nov. 22, 1870.
Fig. 1
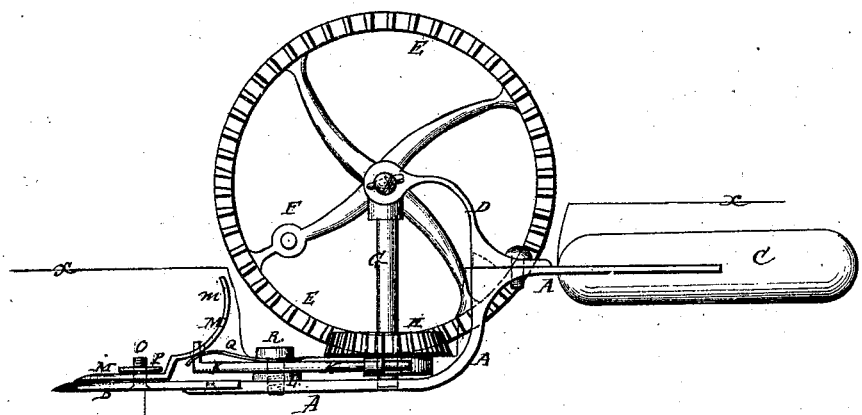
Fig. 2
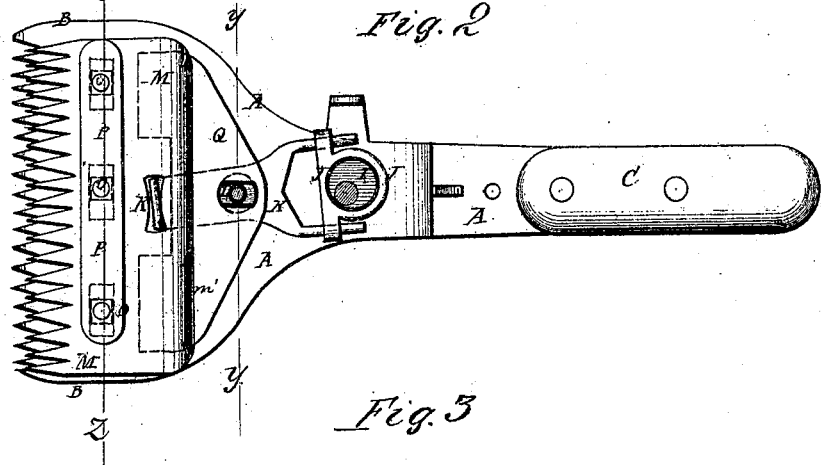
Fig. 3
Fig. 4
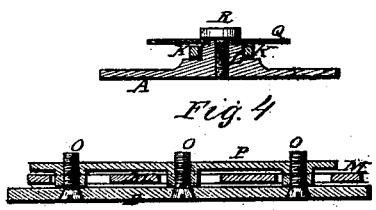
Witnesses:
A. W. Almquist
L. S. Mabee
Inventor:
J. C. Wilson
per Munn & Co.
Attorneys.

United States Patent Office.

JOHN C. WILSON, OF NEW YORK, N. Y.

Letters Patent No. 109,479, dated November 22, 1870.

IMPROVEMENT IN HAIR-CLIPPING DEVICES.

The Schedule referred to in these Letters Patent and making part of the same.

*To all whom it may concern:*

Be it known that I, JOHN C. WILSON, of the city, county, and State of New York, have invented a new and useful Improvement in Horse-clipping Machines; and I do hereby declare that the following is a full, clear, and exact description thereof, which will enable others skilled in the art to make and use the same, reference being had to the accompanying drawing forming part of this specification, in which—

Figure 1 is a side view of my improved horse-clipping machine.

Figure 2 is a top view of the same, partly in section, through the line $x\ x$, fig. 1.

Figure 3 is a detail sectional view of the same, taken through the line $y\ y$, fig. 2.

Figure 4 is a detail sectional view of the same, taken through the line $z\ z$, fig. 2.

Similar letters of reference indicate corresponding parts.

The purpose of my invention is to improve upon the machines heretofore employed by the public for clipping horses.

I will first describe my invention, and then clearly point it out in the claim.

A is the foundation or base-plate of the machine, the forward part or edge of which is made with a shoulder upon its upper side, and to it is firmly but detachably secured by screws the lower cutter-plate B.

In clipping-machines as heretofore constructed the lower cutter-plate has been formed as a solid part of the main plate A; and as the teeth have to be made very hard, and consequently are easily broken, the accidental breakage of one of the teeth rendered the whole machine useless.

By making the part of the plate upon which the teeth are formed detachable, should one of the teeth be accidentally broken the plate B may be easily detached, and replaced with a new plate at trifling expense.

The rear part of the plate A is contracted, curved upward, and projects rearward horizontally, to form a shank for the attachment of the handle C, which may be made of wood. All the other parts of the machine, with the exception of the cutter-plates, spring plate, and screws, are made of malleable cast-iron.

To the upper side of the shank of the base-plate A is secured, by a screw or bolt, an arm, D, which curves upward and forward, and in its projecting end is formed a bearing for the journal of the gear-wheel E, to which is attached a crank-handle, F, by means of which it is operated.

Upon the projecting end of the arm D is also formed a bearing for the upper end of the short vertical shaft G, the lower end of which revolves in a step or socket formed for its reception in the rear part of the base-plate A.

To the lower part of the shaft G is attached a small gear-wheel, H, into which the teeth of the gear-wheel E mesh, so that the said shaft G may be revolved by the revolution of the said gear-wheel E.

The gear-wheels E and H may, if desired, be replaced with friction-wheels.

To the lower part of the shaft G, just below the gear-wheel H, is attached, or upon it is formed, a small eccentric, I, upon which is placed a ring, J, having lugs projecting in opposite directions from its forward side, through holes, in which pass the forks formed upon the rear end of the lever K, so that the rear end of the said lever may be moved laterally or oscillate by the revolution of the eccentric I.

L is a projection, cast solid upon the base-plate A, which passes through a hole formed for its reception in the middle part of the lever K, the said lever resting upon a shoulder formed upon the base part of said projection, as shown in figs. 1 and 3.

The forward end of the lever K is turned upward, and passes through a slot in the upper cutter-plate M.

The end parts of the slot in the plate M are enlarged, as shown in fig. 2, so that, as the lever K is oscillated, only the side edges of its turned-up forward end may bear against the plate M, giving it a lateral oscillation.

The forward part of the plate M is made flat, so that its lower side may rest squarely upon the upper side of the lower plate B, to which it is secured by screws O, the heads of which are countersunk into the lower side of the lower cutter-plate B.

The screws O pass through holes in the lower cutter-plate B, through short slots in the upper cutter-plate M, and screw into screw-holes in the bar P, which extends across the upper side of the upper cutter-plate M.

The bar or long washer P has square projections formed upon its lower side, which enter the slots in the upper cutter-plate M, and cause the said cutter-plate to oscillate in a straight line, and also give longer bearings to the screws O, the said screws being thus unaffected by the oscillation of the said cutter-plate, and not liable to be worked loose by the friction.

The rear part $m'$ of the upper cutter-plate M is curved upward, as shown in figs. 1 and 2, to serve as a guard to prevent the hair from passing back and interfering with or clogging the operating mechanism.

The forward part of the upper cutter-plate M is held down closely upon the forward part of the lower cutter-plate B, to prevent the hair from getting between the two plates, and thus preventing the teeth from operating properly, by the spring plate Q, the forward part of which rests against the lower side of the rear parts of the said upper cutter-plate M, as shown in fig. 1.

The middle part of the forward edge of the spring plate Q is cut away, as shown in dotted lines in fig. 2, so that it may not interfere with the operation of the lever K.

The rear part of the spring plate has a hole formed through it, through which passes the upper end of the projection L, the sides of said upper end being cut away, as shown in fig. 2, to form shoulders for the said plate to rest upon, so that it may not be moved by the oscillation of the lever K.

The spring plate Q and lever K are kept in place upon the projection L by the screw R, which is screwed into a screw-hole formed in the said projection, as shown in figs. 1, 2, and 3.

The projection L thus serves as a pivot for the lever K to work upon, and as a support for the spring plate Q; and its especial object is to remedy the difficulty heretofore experienced with all similar machines from the pivoting screw-bolt or rivet working loose with the friction, and the impossibility heretofore experienced of keeping it firmly in place. My construction entirely removes this difficulty, as the pivot is a solid part of the plate A.

Having thus described my invention,

I claim as new and desire to secure by Letters Patent—

1. An upper cutter-plate, M, provided with the upwardly-curved guard $m'$, to prevent the mechanism from being clogged with hair.

2. An improved horse-clipping machine, formed by the combination of the base-plate A, handle C, arm D, crank gear-wheel E F or equivalent, shaft G, gear-wheel H or equivalent, eccentric I, ring J, lever K, solid projection L, lower detachable cutter-plate B, upper cutter-plate M having a guard, $m'$, formed upon its rear part, long washer and nut-bar P having square projections formed upon its lower side, screws O, and spring plate Q, with each other, substantially as herein shown and described, and for the purpose set forth.

The above specification of my invention signed by me this 24th day of May, 1870.

JOHN C. WILSON.

Witnesses:
GEO. W. MABEE,
JAMES T. GRAHAM.